United States Patent
Cazaux et al.

(10) Patent No.: US 7,094,862 B2
(45) Date of Patent: Aug. 22, 2006

(54) METHOD FOR PREPARING POLYESTERS HAVING INTRACHAIN FREE ACID FUNCTIONS

(75) Inventors: Jean-Bernard Cazaux, Aramon (FR); Charles Brigati, Rochefort Du Gard (FR); Alexandre Louchkoff, Aubagne (FR); Francis Diancourt, Epernon (FR)

(73) Assignee: Societe de Conseils de Recherches et d'Applications Scientifiques (S.C.R.A.S.), (FR)

( * ) Notice: Subject to any disclaimer, the term of this patent is extended or adjusted under 35 U.S.C. 154(b) by 0 days.

(21) Appl. No.: 10/469,444

(22) PCT Filed: Feb. 22, 2002

(86) PCT No.: PCT/FR02/00655

§ 371 (c)(1),
(2), (4) Date: Dec. 1, 2003

(87) PCT Pub. No.: WO02/068499

PCT Pub. Date: Sep. 6, 2002

(65) Prior Publication Data

US 2004/0127676 A1    Jul. 1, 2004

(30) Foreign Application Priority Data

Feb. 27, 2001  (FR)  ................... 01 02630

(51) Int. Cl.
*C08G 63/02*  (2006.01)
(52) U.S. Cl. ............. 528/272; 528/271; 528/274; 528/354
(58) Field of Classification Search ........... 528/271, 528/272, 274, 354
See application file for complete search history.

(56) References Cited

U.S. PATENT DOCUMENTS 6,111,033 A    8/2000  Loughman et al.
6,867,181 B1 *  3/2005  Shalaby et al. .............. 514/2

FOREIGN PATENT DOCUMENTS

WO    0035990    6/2000

OTHER PUBLICATIONS

Canessa, et al, "Racemic . . . Dependence", Polymer Bulletin, vol. 6, 1982, pp. 515-519.
Kuramoto et al, Carboxyl-Containing . . . Polyurethanes, Journal of Applied Polymer Science, vol. 29, 977-983 (1984).

* cited by examiner

*Primary Examiner*—Terressa Boykin
(74) *Attorney, Agent, or Firm*—Charles A. Muserlian

(57) ABSTRACT

The invention relates to a method for preparing polyesters A containing several mid-chain free acid functions by ring-opening polymerisation in the presence of a chain initiator: the benzyl diester of the tartaric acid, the phenyl radical of which is optionally substituted. A: aliphatic based on cyclic esters such as lactides and glycolides.

5 Claims, No Drawings

METHOD FOR PREPARING POLYESTERS HAVING INTRACHAIN FREE ACID FUNCTIONS

This application is a 371 of PCT/FR02/00655 filed Feb. 22, 2002.

STATE OF THE ART

Biodegradable polymers are increasingly popular and are used in widely varying fields and, in particular, those of agri-food and pharmaceuticals. In the pharmaceutical field, the use of polymers has become common for surgical applications (resorbable sutures and staples) and the development of sustained-release dosage forms.

Of all these polymers, the most common result from ring-opening polymerization of hydroxyacid cyclic esters such as the glycolides, lactides or L-lactides. These polymerizations are carried out with these cyclic esters, generally initiated by a hydroxyl (lactic or glycolic hydroxyacid) and catalyzed by compounds as varied as tin salts (ethylhexanoate or octoate) (WO 91/16368), metal-based compounds (aluminium isopropylate, derivatives of tin, zinc etc.) (Macromol. Chem. Phys., C 35, 379 (1995); S. Penczek et al., Macromol. Chem. Phys., 198, 1973 (1997); Xin-De Feng & Yan Jia, Macromol. Symp., 118, 625 (1997); T. M. Ovitt et al., J. Am. Chem. Soc., 1999, 121, 4072).

The use of such polymers has become important for "fixing" active ingredients and regulating sustained release in the organism. Such a mechanism can be used particularly with high-activity medicamentous substances and, in this series, the peptides constitute a family of choice.

The combination of a peptide and a polymer can be carried out either by a "mechanical" phenomenon such as coacervation for example, or by an ionic bond mechanism, particularly favourable if the peptide contains salifiable amine groups.

It is in order to increase this bond potential that there is interest in increasing the acid functions in the same polymer chain. In fact, a polymer or copolymer with a lactide or glycolide base and initiated from an alcohol, contains no acid function on the chain, resulting in the requirement for an acid function on the polymerization initiator in order to have an acid function on the polymer. Thus it has been possible to use (poly)hydroxy(poly) acids such as tartaric acid, malic acid and citric acid as chain initiators in order to increase the number of carboxylic groups on the same chain (U.S. Pat. No. 6,111,033).

However the use of a hydroxyacid as polymerization initiator sometimes has a drawback with respect to the reproducibility of the polymer obtained: in fact, in comparison with the polymerization mechanism which is carried out starting with the alcohol function (initial or generated by ring opening), it often results in a transesterification phenomenon between the polyester chain formed and the acid function of the initiator.

Thus, it is not obvious to retain, in a polymer initiated for example with tartaric acid, free acid functions in the middle (approximately) of the polymer chain since, by transesterification, these functions are substituted and the free acidities are found rejected at the chain end. Moreover, in the case of tartaric acid, an acid degradation phenomenon can be produced under the polymerization conditions: by heating in acid medium, the tartaric acid is dehydrated, generating water and ketosuccinic acid which in its turn is decarboxylated to pyruvic acid. The water generated can open a cyclic ester and thus generate a "parasitic" initiator.

THE INVENTION

The present invention therefore proposes a technique which makes it possible to obtain polymers with intrachain free acid functions (i.e. free acid functions along the chain and approximately in the middle of the chain).

A subject of the invention is therefore a process for the preparation of polyesters containing several free acid functions arranged in the middle of the chain, by ring-opening polymerization in the presence of a chain initiator: tartaric acid benzyl diester, the phenyl radical of which is optionally substituted.

The acid functions of this (poly)hydroxy(poly)acid are protected and stable in the reaction medium under consideration. The phenyl radical can be substituted by one or more identical or different substituents chosen from: nitro, alkoxy. The protective group is preferably chosen in order to be eliminated in neutral hydrolysis.

A more particular subject of the invention is a process as defined above, characterized in that the polyester is based on one of the following compounds: L-lactic acid, D-lactic acid, DL-lactic acid, $\epsilon$-caprolactone, p-dioxanone, $\epsilon$-caproic acid, alkylene oxalate, cycloalkylene oxalate, alkylene succinate, $\beta$-hydroxybutyrate, substituted or non-substituted trimethylene carbonate, 1,5-dioxepan-2-one, 1,4-dioxepan-2-one, glycolide, glycolic acid, L-lactide, D-lactide, DL-lactide, meso-lactide; and all the optically active isomers, racemates or copolymers of the latter.

A more particular subject of the invention is also a process as defined above, characterized in that the polyester is based on one of the following compounds: L-lactic acid, D-lactic acid, DL-lactic acid, $\epsilon$-caprolactone, p-dioxanone, $\epsilon$-caproic acid, substituted or non-substituted trimethylene carbonate, glycolide, glycolic acid, L-lactide, D-lactide, DL-lactide, meso-lactide; and all the optically active isomers, racemates or copolymers of the latter. Preferably, the polyester is based on one of the following compounds: L-lactic acid, D-lactic acid, DL-lactic acid, glycolide, glycolic acid, L-lactide, D-lactide, DL-lactide, meso-lactide; and all the optically active isomers, racemates or copolymers of the latter.

The preparation process according to the invention therefore comprises the following stages:

preparation of a polyester by ring-opening polymerization in the presence of a chain initiator: tartaric acid benzyl diester; the ring-opening polymerization process is implemented according to the techniques known to a person skilled in the art (J. Am. Chem. Soc., 2000, 122, 1552; Polymer International 45, (1998) 60).

deprotection of the carboxy functions: the acid functions of the (poly)hydroxy(poly)acid are clearly protected by groups which can be eliminated by a mechanism making it possible to keep the other ester functions of the polymer chain intact. A polymer can thus be generated which, after deprotection, has intrachain free acid functions.

The deprotection reaction implemented is one of the standard deprotection methods known to a person skilled in the art. In the case of the use of tartaric acid benzyl diester, the deprotection can be carried out according to well-known debenzylation techniques such as catalytic hydrogenation carried out with hydrogen or by hydrogen transfer techniques retaining the integrity of the polymer.

If necessary, the polyester thus obtained can be purified by the standard purification methods known to a person skilled in the art.

In very preferable manner, a subject of the invention is a process as defined above, characterized in that the chain initiator is tartaric acid benzyl diester.

Unless otherwise specified, all the technical and scientific terms used in the present Application have the same meaning as that usually understood by an ordinary specialist in the field to which the invention belongs. Similarly, all the publications, patent applications and all other references mentioned in the present Application, are incorporated by way of reference.

The following examples are presented in order to illustrate the above procedures and should in no event be considered as a limit to the scope of the invention.

Experimental Part

Preparation of a 73/27 L-Lactide Coglycolide Copolymer

Stage 1: Polymerization

Under an inert atmosphere, $m_L$ g of L-lactide, $m_G$ g of glycolide and of benzyl tartrate (DBT) are weighed then homogenized with a Turbula (for approximately 5 minutes) before being loaded into the reactor under a current of nitrogen. 1.3 ml of the polymerization catalyst: Sn(II) ethyl hexanoate (0.2 M in toluene) is added and the reactor is placed under vacuum (P<3 mbar) for 30 minutes at 50° C. The mixture is then subjected to a temperature of approximately 100° C. for 30 minutes then the temperature is raised to B(° C.). Stirring at 25 r.p.m. is maintained for a period C (in hours). The polymer obtained (PLGT(benzyl)) is purified by placing under vacuum (P<3 mbar) at 130° C. for 30 minutes then granulated at approximately 100° C.

The results obtained are shown in Table 1 below.

Stage 2: Deprotection 135 mg of the polymer prepared in Stage 1 and 700 ml of acetone are dissolved under magnetic stirring at ambient temperature for approximately one hour. The solution obtained is introduced into a hydrogenator, then the hydrogenation catalyst (17 g of 10% Pd/C (50% humidity)) is introduced. The reactor is placed under vacuum at ambient temperature then the vacuum is broken with nitrogen. Three hydrogen compression/decompression cycles (P=8 bar) are carried out. The mixture is maintained under stirring at 50° C. and the pressure is regulated at 8 bar for 3 hours. An NMR control is carried out in order to measure the residual level of the protective group. When the residual level is below 0.1%, the suspension is filtered on a bed of filtration agent (tclarcel, cellulose etc.).

Stage 3: Purification

The polyester obtained is purified by solvent route.
The results obtained are shown in Table 2 below.

TABLE 2

| Example | $M_w$ | Tartaric acid (molar %)[3] | Tartaric ester (molar %)[4] |
| --- | --- | --- | --- |
| 1 | 38700 | <0.1 | 0.15 |
| 2 | 16500 | 0.6 | 0.15 |
| 3 | 12000 | 0.85 | 0.34 |
| 4 | 15500 | 0.3 | 0.05 |
| 5 | 20500 | 0.5 | 0.10 |
| 6 | 16000 | 0.1 | 0.05 |
| 7 | 23000 | 0.85 | 0.10 |
| 8 | 15800 | 0.61 | 0.07 |
| 9 | 21300 | 0.67 | 0.00 |
| 10 | 25100 | 0.70 | 0.00 |
| 11 | 16800 | 1.10 | 0.00 |
| 12 | 13333 | 1.40 | 0.00 |

[3] content of free tartaric acid
[4] content of tartaric acid, at least one function of which has undergone transesterification.

With the use of an initiator such as tartaric acid benzyl diester (DBT), we observe the acceleration of the polymerization phenomenon: during polymerization initiated with tartaric acid, the reaction really starts after a certain period of heating which can last up to 30 minutes beyond 160–180° C., a period during which the above-mentioned degradation phenomena can occur. With tartaric acid benzyl diester, the reaction starts instantaneously at a temperature below or equal to 125° C. and is practically completed in 210 minutes.

This phenomenon certainly has the advantage of avoiding the heat degradation likely to occur during prolonged heating. It must be noted that prolonged heating at a high temperature (160–180° C.) causes transesterification phenomena, including with an initiator such as DBT as illustrated in Table 3 below for a load of 1000 g.

TABLE 1

| Example | Load(g)[1] | Initiator % (mole)[2] | B (° C.) | C (hour) |
| --- | --- | --- | --- | --- |
| 1 | 400 | tartaric acid 1.00% i.e. 4.45 g | 200 | 2 |
| 2 | 175 | DBT 2.00% i.e. 8.63 g | 200 | 2 |
| 3 | 175 | DBT 3.00% i.e. 12.90 g | 200 | 2 |
| 4 | 175 | DBT 1.75% i.e. 7.50 g | 200 | 2 |
| 5 | 400 | DBT 1.40% i.e. 13.80 g | 200 | 0.75 |
| 6 | 400 | DBT 1.40% i.e. 13.80 g | 200 | 3 |
| 7 | 175 | DBT 1.40% i.e. 6.00 g | 160 | 3 |
| 8 | 175 | DBT 1.60% i.e. 6.90 g | 140 | 3 |
| 9 | 175 | DBT 1.45% i.e. 6.25 g | 125 | 3.25 |
| 10 | 1000 | DBT 1.45% i.e. 35.6 g | 125 | 3.25 |
| 11 | 1000 | DBT 2.3% i.e. 56.9 g | 125 | 3.5 |
| 12 | 1000 | DBT 2.8% i.e. 69.6 g | 125 | 3.5 |

[1] for a load of 175 g: $m_L$ = 135.6 g and $m_G$ = 39.4 g; for a load of 400 g: $m_L$ = 310 g and $m_G$ = 90 g; for a load of 1000 g: $m_L$ = 775 g and $m_G$ = 225 g.
[2] percentage with respect to the monomers

TABLE 3

| Example | Initiator % (mole) | B (° C.) | C (hour) | $M_w$ | Tartaric acid | Tartaric ester |
| --- | --- | --- | --- | --- | --- | --- |
| 10 | 1.45% i.e. 35.6 g | 125 | 3.255 | 25 100 | 0.70 | 0.00 |
| 10a | 1.45% i.e. 35.6 g | 200 | 1 | 26 000 | 0.57 | 0.10 |
| 10b | 1.45% i.e. 35.6 g | 200 | 2 | 22 800 | 0.42 | 0.14 |

TABLE 3-continued

| Example | Initiator % (mole) | B (°C.) | C (hour) | $M_w$ | Tartaric acid | Tartaric ester |
|---|---|---|---|---|---|---|
| 10c | 1.45% i.e. 35.6 g | 200 | 3 | 21 600 | 0.31 | 0.13 |
| 11 | 2.3% i.e. 56.9 g | 125 | 3.5 | 16 800 | 1.10 | 0.00 |
| 11a | 2.3% i.e. 56.9 g | 160 | 1 | 18 300 | / | / |
| 11b | 2.3% i.e. 56.9 g | 180 | 1 | 18 000 | 0.9 | 0.12 |
| 11c | 2.3% i.e. 56.9 g | 200 | 1 | 18 500 | 0.67 | 0.18 |

The invention claimed is:

1. A process for the preparation of a polyester containing several free acid functions arranged in the middle of the chain, based on a member of the group consisting of L-lactic acid, D-lactic acid, DL-lactic acid, ε-caprolactone, p-dioxanone, ε-caproic acid, alkylene oxalate, cycloalkylene oxalate, alkylene succinate, β-hydroxybutyrate, substituted or non-substituted trimethylene carbonate, 1,5-dioxepan-2-one, 1,4-dioxepan-2-one, glycolide, glycolic acid, L-lactide, D-lactide, DL-lactide, meso-lactide; and all optically active isomers, racemates or copolymers of the latter comprising ring-opening polymerization in the presence of as a chain initiator: tartaric acid benzyl diester, the phenyl portion of the benzyl which is optionally substituted.

2. The process of claim 1, wherein the polyester is based on a member of the group consisting of: L-lactic acid, D-lactic acid, DL-lactic acid, ε-captrolactone, p-dioxanone, ε-caprioc acid, substituted or non-substituted trimethylene carbonate, glycolide, glycolic acid, L-lactide, D-lactide, DL-lactide, meso-lactide, and all optically active isomers, racemates or copolymers of the latter.

3. The process of claim 2, wherein the polyester is based on a member of the group consisting of: L-lactic acid, D-lactic acid, DL-lactic acid, glycolide, glycolic acid, L-lactide, D-lactide, meso-lactide; and all optically active isomers, racemates or copolymers of the latter.

4. The process of claim 1 wherein the chain initiator is unsubstituted tartaric acid benzyl diester.

5. The process of claim 1 wherein:
the preparation of a polyester by ring-opening polymerization in the presence of the chain initiator; is followed by the deprotection of the carboxy functions of the chain initiator.

* * * * *